US011125851B2

(12) United States Patent
Khan

(10) Patent No.: US 11,125,851 B2
(45) Date of Patent: Sep. 21, 2021

(54) GENERATE A RADIO MAP FOR INDOOR NAVIGATION

(71) Applicant: HERE Global B.V., Eindhoven (NL)

(72) Inventor: Muhammad Irshan Khan, Tampere (FI)

(73) Assignee: Here Global B.V., Eindhoven (NL)

( * ) Notice: Subject to any disclaimer, the term of this patent is extended or adjusted under 35 U.S.C. 154(b) by 0 days.

(21) Appl. No.: 16/638,501

(22) PCT Filed: Aug. 14, 2017

(86) PCT No.: PCT/EP2017/070627
§ 371 (c)(1),
(2) Date: Feb. 12, 2020

(87) PCT Pub. No.: WO2019/034239
PCT Pub. Date: Feb. 21, 2019

(65) Prior Publication Data
US 2020/0271748 A1    Aug. 27, 2020

(51) Int. Cl.
G01S 5/02      (2010.01)
H04W 4/33      (2018.01)
(Continued)

(52) U.S. Cl.
CPC ........ *G01S 5/02525* (2020.05); *H04B 17/318* (2015.01); *H04W 4/029* (2018.02); *H04W 4/33* (2018.02); *H04W 64/003* (2013.01)

(58) Field of Classification Search
CPC ..... H04W 4/029; H04W 64/003; H04W 4/80; H04W 4/33; H04W 64/00; G01S 5/14;
(Continued)

(56) References Cited

U.S. PATENT DOCUMENTS 7,466,986 B2 *  12/2008  Halcrow .............. H04W 48/16
                                                      455/456.1
2011/0274000 A1  11/2011  King et al.
(Continued)

FOREIGN PATENT DOCUMENTS

EP        2 741 099 A1    6/2014
WO   WO 2013/149382 A1   10/2013
(Continued)

OTHER PUBLICATIONS

Avers, G. et al., *Crowd-Sourcing Wi-Fi Coverage Data to Building Self-Mapping Radio Maps*, Trans-European Research and Education Networking Association, TNC (2012) 9 pages.
(Continued)

*Primary Examiner* — Magdi Elhag
(74) *Attorney, Agent, or Firm* — Alston & Bird LLP

(57) ABSTRACT

A method, electronic device and apparatus are disclosed. The method comprises obtaining a plurality of fingerprints. Each fingerprint is determined by a respective radio node. One or more respective signals are sent by one or more respective radio nodes surrounding the respective radio node. Each fingerprint comprises a respective piece of position information that, is indicative of the respective location of the radio node that determined the fingerprint. Each fingerprint further comprises at least one respective piece of identifier information associated with and uniquely identifying the respective one or more radio nodes surrounding the respective radio node. The method also includes generating a radio map based at least on the fingerprints; determining a further radio measurement for a current location of the electronic device; and determining the position of the electronic device based at least on the determined further radio measurement and the generated radio map.

16 Claims, 7 Drawing Sheets

(51) Int. Cl.
*H04B 17/318* (2015.01)
*H04W 4/029* (2018.01)
*H04W 64/00* (2009.01)

(58) Field of Classification Search
CPC .... G01S 5/0252; G01S 5/0284; G01S 5/0289; G01S 5/02; G01S 13/878; G01S 5/02521; G01S 5/02524; G01S 5/02525; G01S 5/02526; H04B 17/318
See application file for complete search history.

(56) References Cited

U.S. PATENT DOCUMENTS

| | | | | |
|---|---|---|---|---|
| 2013/0178226 A1* | 7/2013 | Ye | .......................... | H04W 64/00 455/456.1 |
| 2013/0281111 A1 | 10/2013 | Syrjarinne et al. | | |
| 2015/0080017 A1* | 3/2015 | Zhang | .................. | H04W 4/029 455/456.1 |
| 2015/0304816 A1* | 10/2015 | Al-Najjar | .............. | G01S 5/0252 455/456.1 |
| 2015/0304983 A1* | 10/2015 | Krening | ................ | H04B 17/318 370/254 |
| 2016/0161592 A1 | 6/2016 | Wirola et al. | | |
| 2017/0142684 A1* | 5/2017 | Bhatt | .................... | H04B 17/318 |
| 2017/0343640 A1* | 11/2017 | Khan | ..................... | G01S 5/0252 |
| 2018/0242109 A1* | 8/2018 | Wirola | .................. | H04W 4/023 |
| 2018/0352379 A1* | 12/2018 | Kong | ..................... | G01S 5/0252 |
| 2019/0272458 A1* | 9/2019 | Khoche | ................. | H04W 4/029 |

FOREIGN PATENT DOCUMENTS

WO WO 2015/150344 A1 10/2015
WO WO 2016/180480 A1 11/2016

OTHER PUBLICATIONS

Djagash, J. et al., *Range-Only Slam for Robots Operating Cooperatively With Sensors Networks*, (May 2006).
Torees-Gonzalez, A. et al., *Exploiting Multi-Hop Inter-Beacon Measurements in RO-SLAM* (2014) 1101-1107.
International Search Report and Written Opinion for Application No. PCT/EP2017/070627 dated May 22, 2018 (9 pages).

* cited by examiner

GENERATE A RADIO MAP FOR INDOOR NAVIGATION

CROSS-REFERENCE TO RELATED APPLICATIONS

This application is a national phase entry of International Application No. PCT/EP2017/070627, filed Aug. 14, 2017, the entire contents of which are incorporated herein by reference.

Please amend the Abstract as indicated below. A clean copy of the Abstract is provided on a separate sheet at the end of this paper.

FIELD

The following disclosure relates to the field of indoor navigation respectively positioning systems, or more particularly relates to systems, apparatuses, and methods for generating a radio map for indoor navigation and/or floor detection.

BACKGROUND

Indoor positioning requires novel systems and solutions that are specifically developed and deployed for this purpose. The "traditional" positioning technologies, which are mainly used outdoors, for instance satellite and cellular positioning technologies, cannot deliver such performance indoors that would enable seamless and equal navigation experience in both environments.

The required positioning accuracy (within 2 to 3 meters), coverage (~100%) and floor detection are challenging to achieve with satisfactory performance levels with the systems and signals that were not designed and specified for the indoor use cases in the first place. Satellite-based radio navigation signals simply do not penetrate through the walls and roofs for the adequate signal reception and the cellular signals have too narrow bandwidth for accurate ranging by default.

Several indoor-dedicated solutions have already been developed and commercially deployed during the past years, for instance solutions based on pseudolites (Global Positioning System (GPS)-like short-range beacons), ultrasound positioning, Bluetooth Low Energy (BLE) signals (e.g. High-Accuracy Indoor Positioning, HAIP) and Wi-Fi fingerprinting. What is typical to these solutions is that they require either deployment of totally new infrastructure (radio nodes or radio beacons, or tags to name but a few non-limiting examples) or manual exhaustive radio surveying of the buildings including all the floors, spaces and rooms. This is rather expensive and will take a considerable amount of time to build the coverage to the commercially expected level, which in some cases narrowed the potential market segment only to very thin customer base, for instance for health care or dedicated enterprise solutions. Also, the diversity of these technologies makes it difficult to build a globally scalable indoor positioning solution, and the integration and testing will become complex if a large number of technologies needs to be supported in the consumer devices (e.g. smartphones).

For an indoor positioning solution to be commercially successful, that is, i) being globally scalable, ii) having low maintenance and deployment costs, and iii) offering acceptable end-user experience, the solution needs to be based on an existing infrastructure in the buildings and on existing capabilities in the consumer devices. This leads to an evident conclusion that the indoor positioning needs to be based on Wi-Fi- and/or Bluetooth (BT)-technologies that are already supported in every smartphone, tablet, laptop and even in the majority of feature phones. It is, thus, required to find a solution that uses the Wi-Fi- and BT-radio signals in such a way that makes it possible to achieve 2 to 3 meter horizontal positioning accuracy, close to 100% floor detection with the ability to quickly build the global coverage for this approach.

Further, a novel approach for radio-based indoor positioning that models for instance the Wi-Fi-radio environment (or any similar radio e.g. Bluetooth) from observed Received Signal Strength (RSS)-measurements as two-dimensional radio maps and is hereby able to capture the dynamics of the indoor radio propagation environment in a compressable and highly accurate way. This makes it possible to achieve unprecedented horizontal positioning accuracy with the Wi-Fi signals only within the coverage of the created radio maps and also gives highly reliable floor detection. However, the radio maps need to be currently surveyed manually, which is blocking rapid global scalability.

Huge volumes of indoor Wi-Fi measurements data could be harvested via crowd-sourcing if the consumer devices were equipped with the necessary functionality to enable the Wi-Fi data collection as a background process, naturally with the end-user consent. It could also be possible to use volunteers to survey the sites (e.g. buildings) in exchange of reward or recognition and get the coverage climbing up globally in the places and venues important for the key customers. However, the technical challenges related to the harvesting, processing, redundancy, ambiguity and storing the crowd-source data need to be understood and solved first, before the Wi-Fi radio map creation can be based on the machine learning of the indoor Wi-Fi radio maps.

SUMMARY

Radio surveying may take significant time in order to achieve a preferably complete radio map of a venue (e.g. two dimensional and optionally one or more floors of entire venue). Such a radio map may enable accurate indoor positioning estimation and floor detection based on a comparison of a (e.g. gathered respectively measured) radio measurement with those of the radio map. Once such a radio map is obtained, the radio map does not adapt to changes (e.g. additional walls are added to the venue) of the venue. Such changes decrease positioning and/or floor detection performance.

It is thus, inter alia, an object of the invention to generate a radio map of a venue in a quick and efficient way, and which can be adaptive to changes of the venue so that no exhaustive surveying of the venue, e.g. by gathering fingerprints comprising a radio measurement associated with a position in the venue is needed.

According to a first exemplary aspect of the present invention, a method is disclosed, the method, performed by at least one electronic device, comprising:

obtaining a plurality of fingerprints, wherein each respective fingerprint of the plurality of fingerprints is determined by a respective radio node of a venue, wherein one or more respective signals are sent by one or more respective radio nodes surrounding the respective radio node, wherein each respective fingerprint of the plurality of fingerprints comprises a respective piece of position information, wherein the respective piece of position information is indicative of the respective location in the venue of the respective radio node that determined the respective fingerprint, and wherein each respective fingerprint of the plurality of fingerprints further comprises at least one respective piece of identifier information which is associated with the respective one or more radio nodes surrounding the respective radio node, wherein each of the one or more radio nodes surrounding the respective radio node is uniquely identifiable based at least partially on the at least one respective piece of identifier information;

generating a radio map based at least on the obtained plurality of fingerprints;

determining a further radio measurement for a current location of the electronic device; and determining the position of the electronic device based at least on the determined further radio measurement and the generated radio map.

This method may for instance be performed and/or controlled by an electronic device, e.g. a mobile terminal. For instance, the method may be performed and/or controlled by using at least one processor of the electronic device.

According to a second exemplary aspect of the present invention, a method is disclosed, the method, performed by at least one apparatus, comprising:

determining a fingerprint in a venue, wherein the fingerprint comprises a piece of position information indicative of the location in the venue for which the fingerprint is determined, and wherein the determined fingerprint further comprises at least one respective piece of identifier information, which is associated with the respective one or more radio nodes surrounding the apparatus, wherein each of the respective one or more radio nodes surrounding the apparatus is uniquely identifiable based at least partially on the respective piece of identifier information; and broadcasting the determined fingerprint.

This method may for instance be performed and/or controlled by an apparatus, e.g. a radio node. For instance, the method may be performed and/or controlled by using at least one processor of the apparatus.

According to a further exemplary aspect of the invention, a computer program is disclosed, the computer program when executed by a processor causing an electronic device, for instance a mobile terminal, to perform and/or control the actions of the method according to the first and/or second exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an electronic device is disclosed, configured to perform and/or control or comprising respective means for performing and/or controlling the method according to the first exemplary aspect.

The means of the electronic device can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an electronic device is disclosed, comprising at least one processor and at least one memory including computer program code, the at least one memory and the computer program code configured to, with the at least one processor, cause an electronic device, for instance the electronic device, at least to perform and/or to control the method according to the first exemplary aspect.

The above-disclosed electronic device may be a module or a component for a device, for example a chip. Alternatively, the disclosed electronic device according to any aspect of the invention may be a device, for instance a mobile terminal. The disclosed electronic device according to any aspect of the invention may comprise only the disclosed components, for instance means, processor, memory, or may further comprise one or more additional components.

According to a further exemplary aspect of the invention, an apparatus is disclosed, configured to perform and/or control or comprising respective means for performing and/or controlling the method according to the second exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause a radio node, for instance the radio node, at least to perform and/or to control the method according to the second exemplary aspect.

The above-disclosed apparatus may be a module or a component for a device, for example a chip. Alternatively, the disclosed radio node according to any aspect of the invention may be a device, for instance a radio node. The disclosed apparatus according to any aspect of the invention may comprise only the disclosed components, for instance means, processor, memory, or may further comprise one or more additional components.

According to a third exemplary aspect of the invention, a system is disclosed, comprising:

an electronic device according to the first aspect of the present invention as disclosed above, and at least one apparatus according to the second aspect of the present invention as disclosed above.

In the following, exemplary features and exemplary embodiments of all aspects of the present invention will be described in further detail.

The electronic device may for instance be a terminal (e.g. a smartphone, tablet, navigation device, to name but a few non-limiting examples). The electronic device may for instance be portable (e.g. weigh less than 5, 4, 3, 2, or 1 kg).

The electronic device may for instance comprise or be connectable to a display for displaying a radio map, e.g. the generated radio map. The electronic device may for instance be configured to perform indoor navigation and/or positioning (e.g. estimating a position in a venue) and/or floor detection based on the generated radio map. The electronic device may for instance comprise or be connectable to means for outputting sound, e.g. in the form of spoken commands or information. The electronic device and/or the terminal may for instance comprise or be connectable to one or more sensors for determining the electronic devices position, such as radio-based indoor positioning form e.g. observed RSS— (received signal strength) measurements as e.g. a horizontal position and/or floor level in a venue.

Each respective fingerprint of the plurality of fingerprints may for instance be determined (e.g. measured) by a radio node of the venue. The fingerprint may for instance be determined by one or more sensors (e.g. BT (Bluetooth), BLE (Bluetooth Low Energy), and/or Wi-Fi receiver(s)) comprised by or being connectable to each respective radio node. The venue may for instance comprise a plurality of radio nodes. Each of said radio nodes may for instance determine a fingerprint of the plurality of fingerprints. Each respective fingerprint may for instance be determined by measuring one or more signals transmitted by one or more respective radio nodes surrounding the respective radio node determining the fingerprint of the plurality of fingerprints. The one or more signals transmitted by the one or more respective radio nodes surrounding the respective radio node are receivable at the location of the respective radio node. The respective radio node is located in the coverage area of the one or more radio nodes surrounding the respective radio node.

Prior to the obtaining of the plurality of fingerprints, the plurality of fingerprints may for instance be determined by a plurality of radio nodes of the venue, wherein each respective radio node of the plurality of radio nodes may for instance be comprised by an infrastructure of the venue.

The plurality of radio nodes of the venue may for instance be distributed substantially evenly in the venue. The plurality of radio nodes may for instance be distributed substantially evenly in the venue in case each respective radio node is spaced about the same distance apart from each of its direct surrounding radio nodes. For instance, each respective radio node of the plurality of radio nodes may for instance be spaced about 10 meters apart from the next adjacent radio node. The distance may for instance vary, e.g. if there is no location to place a further radio node (e.g. being adjacent to a located radio node) in the venue. Within the meaning of the present invention, the plurality of radio nodes of the venue are substantially evenly distributed in case the distance is pre-defined or determined according to pre-defined rules, e.g. between each of the radio nodes is a distance of about 10 meters, e.g. the mean distance between two adjacent radio nodes is e.g. about 10 meters. The distance between two adjacent radio nodes may for instance be determined based on transmitted power of radio nodes. For instance, the plurality of radio nodes comprised by the infrastructure of the venue are substantially evenly distributed in case the distance between two adjacent radio nodes varies between the range of transmitted (signal) power of the radio nodes. For instance, these distances are ranges for a radio node transmitted at 0 dB. Further radio nodes may for instance be placed at pre-defined distances from surrounding (e.g. neighboring) radio nodes. The pre-defined distance may for instance be determined (e.g. calculated) based on transmitted (signal) power of the radio nodes. For instance, 10 meters is suitable for 0 dBm transmitted (signal) power. In this way, the position of a radio node can be determined to achieve that one or more signals of one or more adjacent radio nodes are receivable at the location. For other one or more transmitted (signal) power, other distances may for instance be determined (e.g. calculated) correspondingly. Thus, the distance between two adjacent radio nodes may for instance be more or less than 10 meters, e.g. in the range of 7 to 12, 8 to 11, or 9 to 10 to name but a few non-limiting examples, but the mean distance may be about 10 meters.

Each respective fingerprint of the plurality of fingerprints may for instance be obtained by receiving each respective fingerprint of the plurality of fingerprints via one or more respective broadcasts of said fingerprint. For instance, at first, a fingerprint is determined by a radio node of the venue. The determined fingerprint may then for instance be transmitted by said radio node by broadcasting the determined fingerprint, e.g. by transmitting each respective fingerprint of the plurality of fingerprints by one or more respective broadcasts. Such a broadcasted fingerprint of said radio node can be obtained (e.g. received), e.g. by the electronic device.

Each respective radio node may for instance be comprised by the venue, e.g. by an infrastructure of the venue. The radio nodes of the venue may for instance be beacons used for indoor positioning and/or floor detection, e.g. according to BT- (Bluetooth) and/or BLE- (Bluetooth Low Energy) specification, or may for instance be Wi-Fi Access Points for indoor positioning and/or floor detection, e.g. according to the WLAN- (Wireless Local Area Network) specification). Indoor positioning and/or floor detection may for instance be performed and/or controlled based on a radio map. Each respective radio node may for instance comprise or be connectable to a transceiver, e.g. according to the BT-, BLE, and/or WLAN-specification to provide wireless-based communication. Each respective radio node may for instance use such a transceiver for determining (e.g. measuring) and/or broadcasting (e.g. sending) the determined fingerprint.

The electronic device may for instance comprise or be connectable to a transceiver, e.g. according to the BT-, BLE, and/or WLAN-specification to provide wireless-based communication. The electronic device may for instance use such a transceiver for obtaining (e.g. receiving) the plurality of fingerprints.

The venue may for instance be a building, shopping mall, office complex, public accessible location (e.g. station, airport, university or the like), to name but a few non-limiting examples.

The radio map may for instance represent a map of the venue, or at least a part (e.g. region or area) of the map of the venue. These parts of the map of the venue may for instance be parts of a larger radio map. These parts may for instance pertain to different venues, or one or more different floors of the venue. The map of the venue may have been divided, e.g. by a regular grid (the parts of the venue may then for instance be (e.g. quadratic) tiles). The radio map as used herein refers to a map (e.g. of the venue) comprising fingerprints (e.g. the plurality of fingerprints) associated with horizontal positions and/or vertical positions located within the venue. Based on a comparison of the fingerprints of the radio map and a radio measurement (e.g. the further radio measurement determined (e.g. measured) by the electronic device), indoor positioning and/or floor detection (e.g. horizontal and/or vertical position estimation) may for instance be performed.

The radio map may for instance be generated by associating the respective radio measurement with a corresponding location (e.g. horizontal and/or vertical position, e.g. in a venue) represented by a piece of respective position information of a map (e.g. of the venue). The respective radio measurement and the piece of respective position information may for instance be comprised by a respective fingerprint. Additionally, such a respective fingerprint may for instance be comprised by the generated radio map. The generated radio map may for instance be stored in a memory, e.g. the memory. The memory may for instance be comprised or be connectable to the at least one apparatus performing and/or controlling the method according to the first exemplary aspect of the present invention. In the latter case, the memory may for instance be accessible by the at least one apparatus, in which case the memory may not be comprised by the at least one apparatus.

The generated radio map may for instance be available to the electronic device by being stored in or at the electronic device, or by being accessible by the electronic device, e.g. via a wireless or wire-bound connection e.g. to an apparatus that stores the generated radio map (e.g. a server or a server cloud). This apparatus may be remote from the electronic device or may be included with the electronic device into one device.

Optionally, the radio map may for instance be outputted.

The radio map may for instance be outputted by being provided or caused providing (e.g. to a server, or to another apparatus (e.g. an IoT (Internet of Things) device, which may not be capable of generating the radio map on its own, or to another apparatus that transfers the generated radio map to the server. For instance, a central device or a server may generate the radio map and share (e.g. transmit respectively transfer) the generated radio map to an IoT device. The IoT device may for instance use the provided radio map to determine its position (e.g. horizontal and/or vertical position).

The outputted radio map may for instance be used for performing indoor positioning and/or floor detection, e.g. by another electronic device or by a plurality of other electronic devices.

The further radio measurement may for instance be determined by measuring the further radio measurement. The further radio measurement may for instance be determined by the electronic device. The further radio measurement is determined for the current location of the electronic device in the venue. The further radio measurement may for instance be measured by one or more sensors (e.g. BT (Bluetooth), BLE (Bluetooth Low Energy), and/or Wi-Fi receiver(s)) comprised by or being connectable to the electronic device.

The further radio measurement may for instance be determined based at least partially on one or more respective signals that are sent by one or more respective radio nodes surrounding the electronic device. The further radio measurement ay for instance further comprise at least one respective piece of identifier information which is associated with the respective one or more radio nodes surrounding the electronic device, wherein each of the one or more radio nodes surrounding the electronic device is uniquely identifiable based at least partially on the at least one respective piece of identifier information The further radio measurement may for instance comprise at least one RSS value observable at the current location. The at least one RSS value may for instance be obtained from one or more signals of one or more radio nodes surrounding the electronic device, or in whose coverage areas the electronic device is located so that their one or more signals are observable (e.g. receivable).

The performing of the position estimation is based at least partially on the obtained further radio measurement and the generated radio map, e.g. by comparing the obtained further radio measurement with the plurality of fingerprints of the radio map. One or more value comprised by a respective fingerprint of the plurality of fingerprints of the radio map equaling or being closest to equaling the obtained further radio measurement may for instance be determined to represent the current location of the at least one electronic device.

It should be noted that the step of determining the plurality of fingerprints and the step of determining the further radio measurement may take place in parallel. Alternatively, the step of determining the plurality of fingerprints and the step of determining the further radio measurement may take place consecutively.

Each respective fingerprint of the plurality of fingerprints comprises a respective piece of position information, wherein the respective piece of position information is indicative of the respective location in the venue of each respective radio node that determined the respective fingerprint.

The respective piece of position information may for instance be indicative of a horizontal position and additionally of a floor (e.g. a vertical position) of the venue. The piece of position information may for instance comprise at least a pair of latitude/longitude coordinates, and additionally an altitude, or x-, y-coordinates, and additionally a floor level of the venue (e.g. an altitude, or a z-coordinate, to name but a few non-limiting examples).

Based on the at least one piece of position information, e.g. the location of the one or more radio nodes, wherein each of the respective one or more radio nodes that determined a respective fingerprint of the plurality of fingerprints, may for instance be determined.

The position information may for instance be determined based on an identifier information of the respective radio node, wherein the position of the respective radio node represented by a piece of respective position information may for instance be associated with a piece of respective identifier information. For instance, one or more pieces of respective identifier information associated with one or more pieces of respective position information may be stored in a database, e.g. stored in a memory, e.g. a database. Based on the identifier information, the piece of respective position information may for instance be determined, e.g. by a look-up in the stored memory. The respective piece of position information may for instance be taken into account when generating the radio map.

Each respective fingerprint of the plurality of fingerprints further comprises at least a respective piece of identifier information which is associated with the respective one or more radio nodes surrounding the respective radio node, wherein each of the one or more radio nodes surrounding the respective radio node is uniquely identifiable based at least partially on the piece of identifier information.

Each respective radio node of the venue may for instance transmit one or more signals comprising at least a respective piece of identifier information of said radio node. In case the one or more transmitted signals of a respective radio node are received, e.g. by the respective radio node determining a respective fingerprint, each respective radio node of said fingerprint may for instance be identified based at least partially on the piece of respective identifier information comprised by the transmitted one or more signals.

Each respective fingerprint may for instance comprise one or more respective pieces of identifier information of the respective one or more radio nodes. In case more than one respective pieces identifier information are comprised by each respective fingerprint, each respective fingerprint may for instance comprise said more than one identifiers of the respective one or more radio nodes as a list.

For instance, based on one or more identifiers comprised by each respective fingerprint, the respective piece of position information may be determined in order to determine the location of the respective radio node in the venue.

Additionally or alternatively, the further radio measurement may for instance comprise one or more respective pieces of identifier information of the respective one or more radio nodes, wherein the one or more respective pieces of identifier information may for instance be indicative of the respective one or more radio nodes, from which the respective one or more signals stem. In case more than one pieces of identifier information are comprised by the further radio measurement (e.g. the fingerprint is determined based on one or more signals of more than one radio node of the venue), the further radio measurement may for instance comprise said more than one pieces of identifier information (e.g. of the respective one or more radio nodes) e.g. as a list.

According to an exemplary embodiment of the first aspect of the present invention, each respective fingerprint of the plurality of fingerprints is indicative of a respective received signal strength value of the one or more respective signals received by the respective radio node.

The piece of position information may for instance be associated with the at least one RSS value. Alternatively, in case the at least one piece of position information is not comprised by each respective fingerprint, the piece of position information may for instance be stored, e.g. in a database so that the piece of position information is accessible, e.g. the piece of position information may for instance be read by or be transmitted to the electronic device. In this case, each respective fingerprint may for instance be associated with the piece of position information.

According to an exemplary embodiment of the first aspect of the present invention, the method further comprises:

interpolating the generated radio map prior to the determining of the position of the electronic device.

By interpolating the generated radio map, such parts of the generated radio map, which are not associated with one or more fingerprints of the plurality of fingerprints, may for instance be associated with corresponding values and/or information.

The generated radio map may for instance be interpolated e.g. by calculating in-between-values between at least two adjacent grid-points of the radio map to which a fingerprint of the plurality of fingerprints may be associated. Further details of the radio map comprising a plurality of grid-points are disclosed in the following.

According to an exemplary embodiment of the first aspect of the present invention, the radio map is divided into a grid-like arrangement comprising a plurality of grid-points, wherein each grid-point of the plurality of grid-points is associated with a respective fingerprint of the plurality of fingerprints determined at the location of the venue corresponding to the grid-point of the radio map. Each grid-point of the plurality of grid-points may for instance be associated with exactly one respective fingerprint. Alternatively, each grid-point of the plurality of grid may for instance be associated with at least one respective fingerprint, or with more than one respective fingerprints of the plurality of grid-points.

The plurality of grid-points may for instance be distributed across the radio map. For instance, the plurality of grid-points may for instance be substantially evenly distributed across the radio map. For instance, the plurality of grid-points may be substantially evenly distributed across the radio map in case each respective grid-point of the plurality of grid-points is spaced about the same distance to each of its adjacent grid-points of the plurality of grid-points. For instance, each respective grid-point of the plurality of grid-points may be spaced about e.g. 0.5 to 5 meters, 1 to 4 meters, or 2 to 3 meters to the next adjacent grip-point (true to scale of the radio map), to name but a few non-limiting examples. Additionally, interpolation may for instance be performed to fill the grid. For instance, based on one or more values (e.g. RSS value) associated with a grid-point, grid-points having no value associated with them between two adjacent grid-points being associated with one or more values (e.g. RSS value) may for instance be determined (e.g. calculated) by the interpolation. Within the meaning of the present invention, the grid-points of the radio map are substantially evenly distributed across the radio map in case the distance between two adjacent grid-points varies, but each of the distances between two adjacent grid-points of the plurality of grid-points is close to the same distance. The distances between each of the grid-points of the plurality of grid-points may for instance result in a mean value, which may equal or nearly equal (e.g. +−10% deviation) a pre-defined value. In case the mean value of all distances between two adjacent grid-points of the plurality of grid-points equals or nearly equals the pre-defined value (e.g. 5 meters), the grid-points of the plurality of grid-points are considered to be substantially evenly distributed. The distance between two adjacent grid-points of the plurality of grid-points may for instance vary, as mentioned above in this specification with respect to the distance between two adjacent radio nodes.

According to an exemplary embodiment of the first aspect of the present invention, the generated radio map is outputted.

The generated radio map may for instance be outputted by one or more broadcasts, e.g. transmitted one or more broadcasts. In this way, a generated radio map (e.g. by the electronic device) may for instance be shared with one or more other devices (e.g. central devices, radio nodes, which may e.g. relay the received radio map to a server or the like). The outputted radio map may for instance be stored in a memory, e.g. a memory comprised by or being accessible by the device receiving the radio map. According to an exemplary embodiment of the first aspect of the present invention, the position estimation is performed, at least partially, by determining the likelihood that the obtained further radio measurement (e.g. relatively) matches one of the fingerprints associated with the radio map.

For performing the determining of the position of the electronic device, the grid-point of the generated radio map may for instance be chosen to be e.g. the RSS value which corresponds to (e.g. equals) the RSS value comprised by the determined further radio measurement.

Further, a likelihood, if a RSS value of a determined further fingerprint or a determined (e.g. measured) radio measurement corresponds to one fingerprint respectively radio measurement of the generated radio map, may for instance be determined (e.g. calculated) by a so-called Bayesian method. The Bayesian method may for instance use a normal density function. Additionally or alternative, the Bayesian method may for instance use a MSE (mean square error) for estimating the electronic devices position based at least partially on the generated radio map.

Additionally or alternatively, the determining of the likelihood may for instance comprise combining a determined likelihood that the current location (based on the determined further radio measurement) relatively matches a location of one of the grid points of the plurality of grid-points of the radio map based on a comparison of the determined further radio measurement to the plurality of fingerprints of the generated radio map by determining (e.g. calculating) weighted mean values. For instance, the calculated likelihood at grid points of the plurality of grid-points of the generated radio map may for instance be combined with weighted mean values to estimate the electronic devices position.

According to an exemplary embodiment of the first aspect of the present invention, the plurality of fingerprints are obtained based at least partially on one or more broadcasted fingerprints transmitted by the one or more respective radio nodes surrounding the respective radio node.

For instance, the plurality of fingerprints is broadcasted by a plurality of radio nodes. These (broadcasted) plurality of fingerprints are obtained (e.g. received) by the electronic device.

According to an exemplary embodiment of the first aspect of the present invention, the electronic device is a mobile device, e.g. a terminal.

The electronic device may for instance be a terminal, e.g. a smartphone, a tablet, or a mobile navigation device, to name but a few non-limiting examples.

The electronic device may for instance be a mobile device, and not a stationary device. Mobility of the electronic device may for instance be ensured by the electronic device comprising or being connectable to means for enabling wireless communication, e.g. communication according to WLAN- and/or BLE-standard and/or according to cellular radio communication standard to name but a few non-limiting examples.

As introduced above, according to the second exemplary aspect of the present invention, a method, performed by at least one apparatus, is disclosed, comprising:
  determining a fingerprint in a venue, wherein the fingerprint comprises a piece of position information indicative of the location in the venue at which the fingerprint is determined, and wherein the determined fingerprint further comprises at least one respective piece of identifier information, which is associated with the respective one or more radio nodes surrounding the apparatus, wherein each of the respective one or more radio nodes surrounding the apparatus is uniquely identifiable based at least partially on the respective piece of identifier information; and
  broadcasting the determined fingerprint.

The determined fingerprint may for instance be broadcasted, e.g. by transmitting or sending the determined fingerprint. The broadcasted fingerprint may for instance be receivable by every apparatus and/or electronic device in the coverage area of the apparatus that broadcasts the determined fingerprint. The broadcasted fingerprint may for instance be a beacon, and/or may be comprised by a beacon. Additionally or alternatively, the determined fingerprint may for instance be at least a part of a piece of advertisement information, which may be broadcasted by the at least one apparatus. The piece of advertisement information may for instance be defined according to the Neighbor Discovery Protocol (NDP), which may for instance be used by the at least one apparatus. The piece of advertisement information may for instance be used by the at least one apparatus to inform devices (e.g. electronic devices or radio nodes) located in the coverage area of the at least one apparatus of the presence of the at least one apparatus.

The fingerprint is determined for the current location of the at least one apparatus in the venue. The fingerprint may for instance be measured by one or more sensors (e.g. BT (Bluetooth), BLE (Bluetooth Low Energy), and/or Wi-Fi receiver(s)) comprised by or being connectable to the at least one apparatus.

The fingerprint may for instance be determined based at least partially on one or more respective signals that are sent by one or more respective radio nodes surrounding the at least one apparatus. The fingerprint may for instance comprise a respective piece of position information, wherein the respective piece of position information is indicative of the respective location in the venue of the at least one apparatus that determined the fingerprint. The fingerprint may for instance further comprise at least one respective piece of identifier information which is associated with the respective one or more radio nodes surrounding the at least one apparatus, wherein each of the one or more radio nodes surrounding the at least one apparatus is uniquely identifiable based at least partially on the at least one respective piece of identifier information The determined fingerprint comprises a piece of position information indicative of the location in the venue for which the fingerprint is determined.

The apparatus determining the fingerprint may for instance be a stationary device located in the venue. Thus, the position of the apparatus may be known. The piece of position information may for instance be indicative of the horizontal position of the apparatus in the venue and additionally of the floor of apparatus in the venue. The piece of position information may for instance comprise at least a pair of latitude/longitude coordinates, and additionally an altitude, or x, y-coordinates, and additionally a floor level of the venue (e.g. a z-coordinate) to represent the position of the apparatus in the venue.

The determined fingerprint further comprises at least one respective piece of identifier information which is associated with the at least one surrounding radio node, wherein the respective one or more radio nodes surrounding the apparatus, wherein each of the respective one or more radio nodes is uniquely identifiable based at least partially on the respective piece of identifier information.

According to an exemplary embodiment of the second aspect of the present invention, the determined fingerprint is indicative of a respective received signal strength value of one or more respective signals sent by the respective one or more radio nodes surrounding the apparatus.

The fingerprint may for instance be determined by measuring a RSS value of one or more respective signals, which are receivable (e.g. observable) at the location of the apparatus, wherein the one or more respective signals are transmitted (e.g. sent) by one or more respective radio nodes surrounding the at least one apparatus.

According to an exemplary embodiment of the second aspect of the present invention, the determined fingerprint is stored in a database comprised by or being connectable to the apparatus.

The database may for instance be a part of the apparatus. The apparatus and the database may for instance be one device. The determined fingerprint stored in the database may for instance be broadcasted. The determined fingerprint stored in the database may for instance be updated, e.g. in pre-defined or according to pre-defined rules time intervals. The time between an update of a stored fingerprint may for instance be monthly, weekly, daily, hourly, minutely or secondly, to name but a few non-limiting examples. The more often the determined fingerprint stored in the database is updated, the more up-to-date the fingerprint is and represents the current properties (e.g. number of radio nodes, obstacle (e.g. walls, open spaces, or the like) to name but a few non-limiting examples) of the venue.

According to an exemplary embodiment of the second aspect of the present invention, the apparatus is a stationary device.

The stationary device may for instance be a radio node. The stationary device may for instance comprise or be connectable to one or more transceivers (e.g. according to WLAN communication standard and/or BLE communication standard and/or cellular radio communication standard) to provide wireless-based communication. The one or more transceivers may for instance be used for i) determining the fingerprint, and/or ii) for broadcasting the determined fingerprint.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION

The following description serves to deepen the understanding of the present invention and shall be understood to complement and be read together with the description as provided in the above summary section of this specification.

Figure 1:
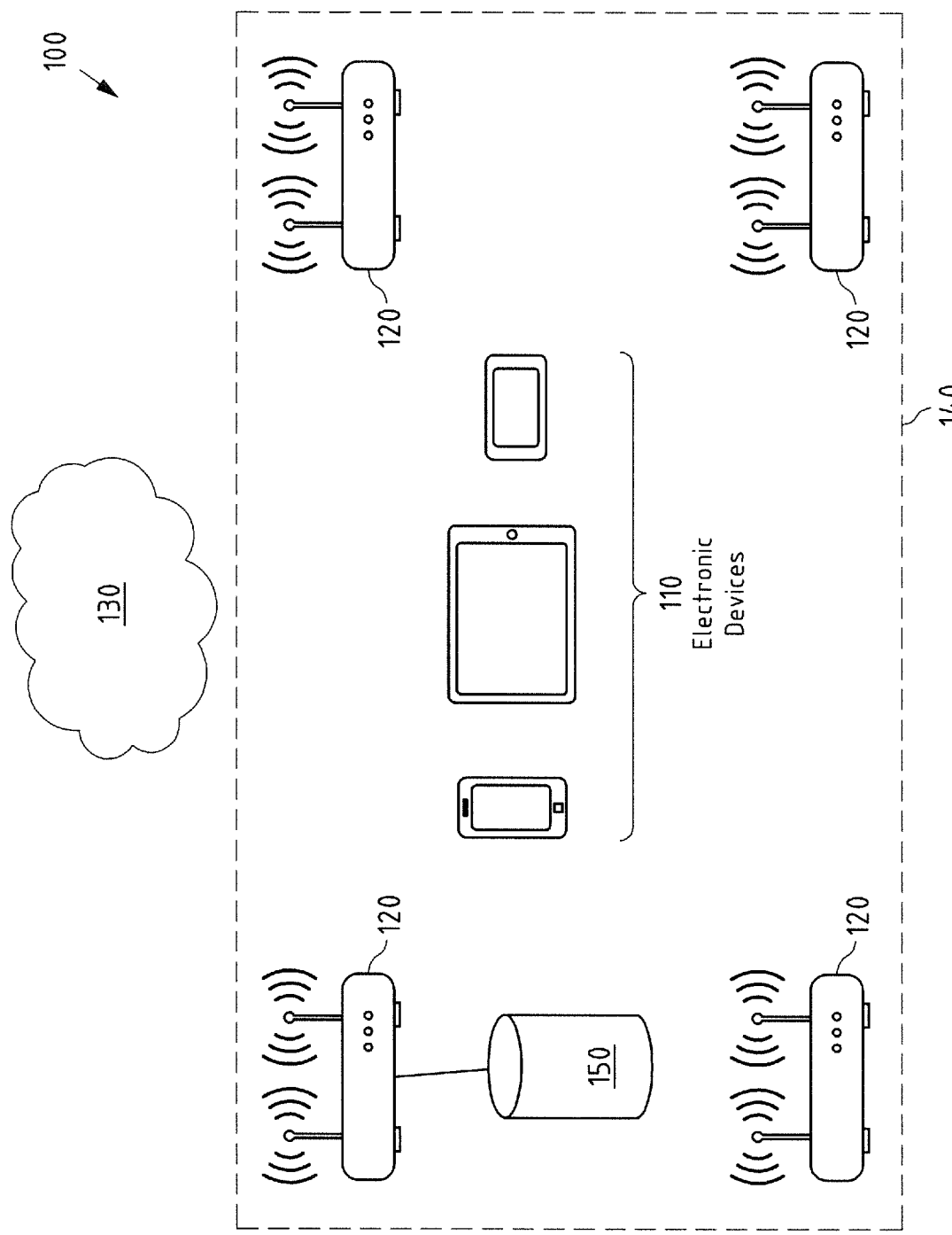
FIG. 1 a schematic block diagram of an example embodiment of a system of the present invention.

FIG. 1 shows a schematic block diagram of an example embodiment of a system according to the third exemplary aspect of the present invention.

The system 100 comprises an example electronic device 110 according to the first exemplary aspect of the present invention and an example apparatus 120 according to the second exemplary aspect of the present invention.

The system 100 comprises a plurality of stationary devices. At hand, each of the plurality of stationary devices is a radio node 120, wherein each of the plurality of radio nodes 120 is embodied as an apparatus according to the second exemplary aspect of the present invention. Further at hand, the electronic device 110 is a mobile device, of which three different realizations are exemplarily shown: a mobile phone (e.g. a smartphone), a tablet, and a portable navigation device. Further, the electronic device 110 may for instance be an IoT (Internet of Things) device, which may be e.g. reasonably priced and comprise simple hardware. Further, the system 100 comprises a communication network 130, e.g. the Internet or an other wireless-based communication network, such as a Wireless Local Area Network (WLAN), or a Bluetooth based communication network. The radio nodes 120 are comprised by a venue 140. The system 100 comprises a database 150, which is connectable to the radio nodes 120. A database 150 may for instance be comprised by each of the radio nodes 120, or a central database may be used, which is accessible (e.g. via the communication network 130) by each of the radio nodes 120.

Communication between the electronic device 110, and at least one of the radio nodes 120 may for instance take place at least partially in a wireless fashion, e.g. based on cellular communication or on WLAN- and/or BLE-based communication, to name but a few non-limiting examples. For instance, communication network 130 may for instance provide such a communication. Additionally or alternatively, a separate communication network (not shown in FIG. 1) may for instance provide such a communication. Further, the same network (e.g. communication network 130 and/or separate communication network) may for instance be used for both communication and positioning, e.g. provided by the system 100. Mobility of the electronic device 110 can be guaranteed by employing wireless-based communication.

The electronic device 110 may for instance comprise one or more means (e.g. a sensor, a transceiver, a receiver, a sender, or a combination thereof, e.g. a sender and a receiver) for a communication with at least one of the radio nodes 120.

Correspondingly, the at least one radio node of the radio nodes 120 comprises one or more corresponding means.

Figure 2:
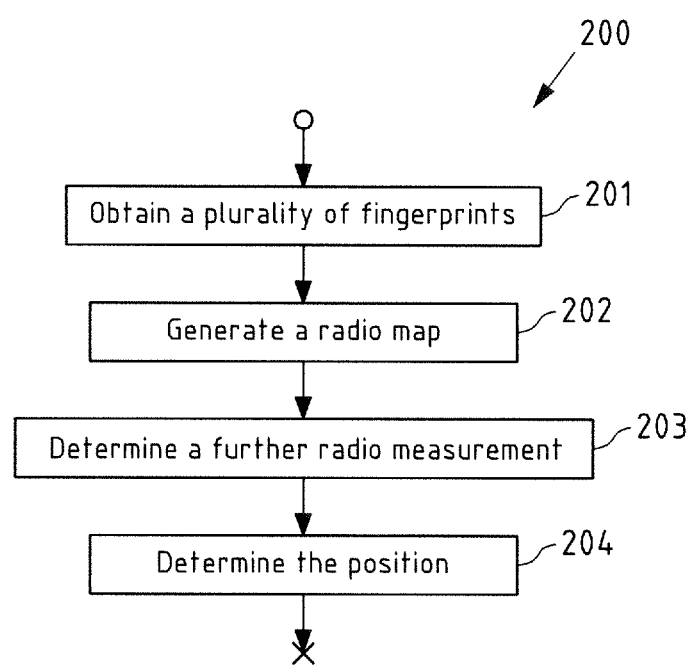
FIG. 2 a flow chart illustrating an example operation, e.g. in the at least one electronic device, e.g. according to FIG. 4, of an example method according to the present invention.
Figure 4:
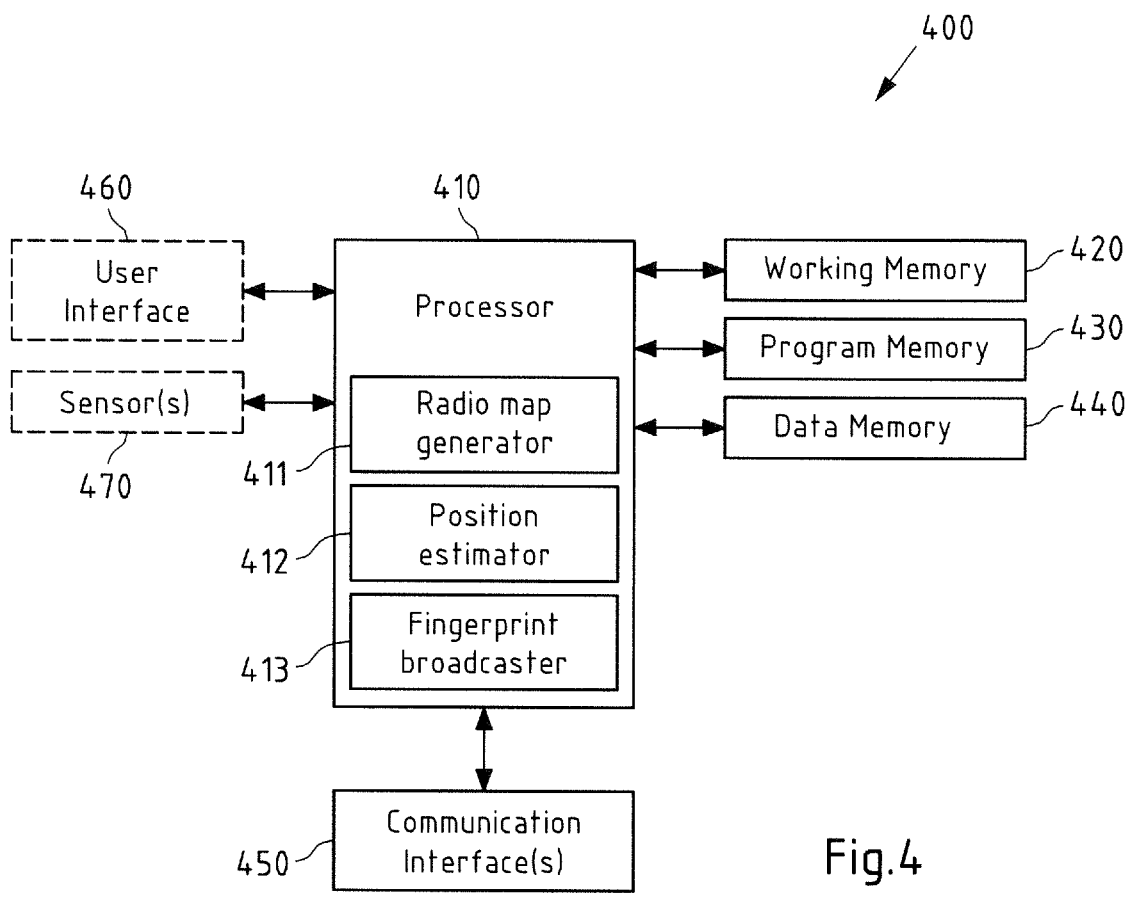
FIG. 4 a schematic block diagram of an example embodiment of an apparatus and/or an electronic device according to the present invention.

FIG. 2 is a flow chart 200 illustrating an example operation, e.g. in the at least one electronic device, e.g. according to FIG. 4, of an example method according to the first exemplary aspect of the present invention.

The flow chart 200 may for instance be performed by the electronic device 110 of FIG. 1.

In step 201, a plurality of fingerprints is obtained. The plurality of fingerprints are obtained e.g. by electronic device 110 of FIG. 1. Each respective fingerprint of the plurality of fingerprints is obtained by receiving a broadcast of said respective fingerprint. Each respective fingerprint of the plurality of fingerprints may for instance be broadcasted by each of the respective radio nodes 120 of FIG. 1.

In step 202, a radio map is generated. The radio map is generated based at least on the obtained plurality of fingerprints (see step 201). The radio map is generated by the electronic device (e.g. the electronic device 110 of FIG. 1). The generated radio map may for instance be stored in a memory, e.g. database (not shown in FIG. 1), e.g. comprised by or being accessible by the electronic device (e.g. the electronic device 110 of FIG. 1).

In step 203, a further radio measurement is determined. The further radio measurement is determined by the electronic device (e.g. the electronic device 110 of FIG. 1). The further radio measurement is determined by measuring one or more respective signals of one or more respective radio nodes (e.g. radio nodes 120 of FIG. 1) surrounding the electronic device (e.g. the electronic device 110 of FIG. 1). Based on the measured one or more respective signals, at least one RSS value can be determined, which is observable at the current location at which the electronic device (e.g. the electronic device 110 of FIG. 1) is located when determining the further radio measurement.

In step 204, the position of the electronic device (e.g. the electronic device 110 of FIG. 1) is determined. The position of the electronic device may for instance be estimated. The determining of the position of the electronic device (e.g. the electronic device 110 of FIG. 1) is performed by the electronic device (e.g. the electronic device 110 of FIG. 1). The current location, at which the further radio measurement is determined, may for instance be estimated. In this way, indoor navigation respectively positioning and/or floor detection can be performed by the electronic device (e.g. the electronic device 110 of FIG. 1).

Figure 3:
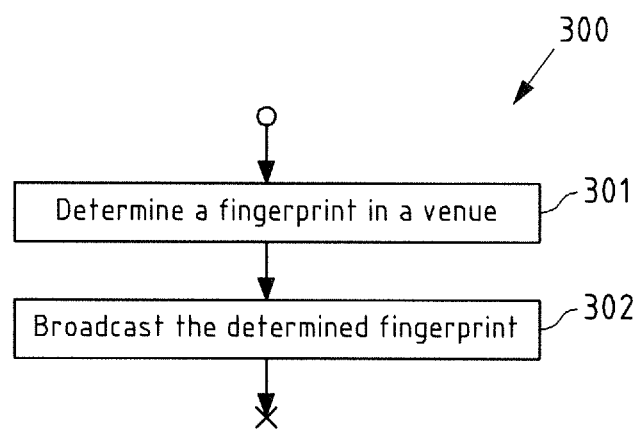
FIG. 3 a flow chart illustrating an example operation, e.g. in the at least one apparatus, e.g. according to FIG. 4, of an example method according to the present invention.

FIG. 3 is a flow chart 300 illustrating an example operation, e.g. in the at least one apparatus, e.g. according to FIG. 4, of an example method according to the second exemplary aspect of the present invention.

The flow chart 300 may for instance be performed by each of the radio nodes 120 of FIG. 1.

In step 301, a fingerprint is determined in a venue (e.g. the venue 140 of FIG. 1). The fingerprint is determined by a radio node (e.g. one of the respective radio nodes 120 of FIG. 1). The fingerprint may for instance be determined by measuring one or more respective signals of one or more respective radio nodes (e.g. the respective radio nodes 120 of FIG. 1) surrounding the respective radio node (e.g. one of the respective radio nodes 120 surrounded by the other respective radio nodes 120 of the plurality of radio nodes 120 of FIG. 1). Based on the measured one or more respective signals, at least one RSS value may be determined, which is observable at a current location of the respective radio node.

In step 302, the determined fingerprint is broadcasted. The determined fingerprint is broadcasted by the respective radio node (e.g. one of the respective radio nodes 120 of FIG. 1).

Each of the respective radio nodes 120 of the plurality of radio nodes 120 of FIG. 1 may for instance perform and/or control at least the steps 301 and 302 of FIG. 3. Thus, each of the respective radio nodes 120 of the plurality of radio nodes 120 of FIG. 1 broadcasts at least one determined fingerprint. These broadcasted fingerprints can be obtained by an electronic device, e.g. electronic device 110 of FIG. 1 in case the electronic device (e.g. electronic device 110 of FIG. 1) is located in the respective coverage area of the respective radio nodes (e.g. radio nodes 120 of FIG. 1). The electronic device can then perform and/or control at least the steps 201 to 204 of FIG. 2. In this way, at least one radio node and at least one electronic device may for instance form a system according to the third exemplary aspect of the present invention.

It will be understood, that one or more respective broadcasted fingerprints (see step 302 of FIG. 3) may be obtained by each respective electronic device of a plurality of electronic devices. Each respective electronic device of the plurality of electronic devices may perform and/or control at least the steps 201 to 204 of FIG. 1 so that indoor navigation respectively positioning and/or floor detection can be performed and/or controlled by each respective electronic device of the plurality of electronic devices.

FIG. 4 is a schematic block diagram of an apparatus 400 according to an exemplary aspect of the present invention, which may for instance represent the electronic device 110 of FIG. 1. Alternatively, the schematic block diagram of the apparatus 400 according to an exemplary aspect of the present invention may for instance represent at least one of the radio nodes 120 of FIG. 1.

Apparatus 400 comprises a processor 410, working memory 420, program memory 430, data memory 440, communication interface(s) 450, an optional user interface 460 and an optional sensor(s) 470.

Apparatus 400 may for instance be configured to perform and/or control or comprise respective means (at least one of 410 to 470) for performing and/or controlling the method according to the first exemplary aspect. Apparatus 400 may as well constitute an apparatus comprising at least one processor (410) and at least one memory (420) including computer program code, the at least one memory and the computer program code configured to, with the at least one processor, cause an apparatus, e.g. apparatus 400 at least to perform and/or control the method according to exemplary aspects of the invention.

Processor 410 may for instance comprise a radio map generator 411 as a functional and/or structural unit. Radio map generator 411 may for instance be configured to generate a radio map (see step 202 of FIG. 2). Processor 410 may for instance comprise a position estimator 412 as a functional and/or structural unit. Position estimator 412 may for instance be configured to perform a position estimation (see step 204 of FIG. 2). Processor 410 may for instance comprise a fingerprint broadcaster 413 as a functional and/or structural unit. Fingerprint broadcaster 413 may for instance be configured to broadcast a (determined) fingerprint (see step 302 of FIG. 3). Processor 410 may for instance further control the memories 420 to 440, the communication interface(s) 450, the optional user interface 460 and the optional sensor(s) 470. In case the apparatus 400 (e.g. an electronic device, e.g. electronic device 110 of FIG. 1) is configured to perform and/or control the method according to the first aspect of the present invention, processor 410 may comprise the radio map generator 411 and the position estimator 412. In case the apparatus 400 (e.g. a radio node, e.g. at least one of the radio nodes 120 of FIG. 1) is configured to perform and/or control the method according to the second aspect of the present invention, processor 410 may comprise the fingerprint broadcaster 413.

Processor 410 may for instance execute computer program code stored in program memory 430, which may for instance represent a computer readable storage medium comprising program code that, when executed by processor 410, causes the processor 410 to perform the method according to the first exemplary aspect be performed and/or controlled by an electronic device, for instance a mobile terminal, or the further method to be performed and/or controlled by an apparatus, for instance a radio node.

Processor 410 (and also any other processor mentioned in this specification) may be a processor of any suitable type. Processor 410 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 410 may for instance be an application processor that runs an operating system.

Program memory 430 may also be included into processor 410. This memory may for instance be fixedly connected to processor 410, or be at least partially removable from processor 410, for instance in the form of a memory card or stick. Program memory 430 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 430 may also comprise an operating system for processor 410. Program memory 430 may also comprise a firmware for apparatus 400.

Apparatus 400 comprises a working memory 420, for instance in the form of a volatile memory. It may for instance be a Random Access Memory (RAM) or Dynamic RAM (DRAM), to give but a few non-limiting examples. It may for instance be used by processor 410 when executing an operating system and/or computer program.

Data memory 440 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 440 may for instance store a generated radio map and/or a determined fingerprint.

Communication interface(s) 450 enable apparatus 400 to communicate with other entities. In case the apparatus 400 is configured to perform and/or control the method according to the first exemplary aspect of the present invention, communication interface(s) 450 enables apparatus 400 to communicate e.g. with at least one of the radio nodes 120 of FIG. 1. In case the apparatus 400 is configured to perform and/or control the method to be performed and/or controlled by e.g. a radio node, communication interface(s) 450 enables apparatus 400 to communicate e.g. with the electronic device 110 of FIG. 1. The communication interface(s) 450 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 400 to communicate with other entities, for instance with server 110 of FIG. 1.

User interface 460 is optional and may comprise a display for displaying information to a user and/or an input device (e.g. a keyboard, keypad, touchpad, mouse, etc.) for receiving information from a user.

Sensor(s) 470 are optional and may for instance comprise a barometric sensor, e.g. to determine pressure information.

Some or all of the components of the apparatus 400 may for instance be connected via a bus. Some or all of the components of the apparatus 400 may for instance be combined into one or more modules.

Figure 5:
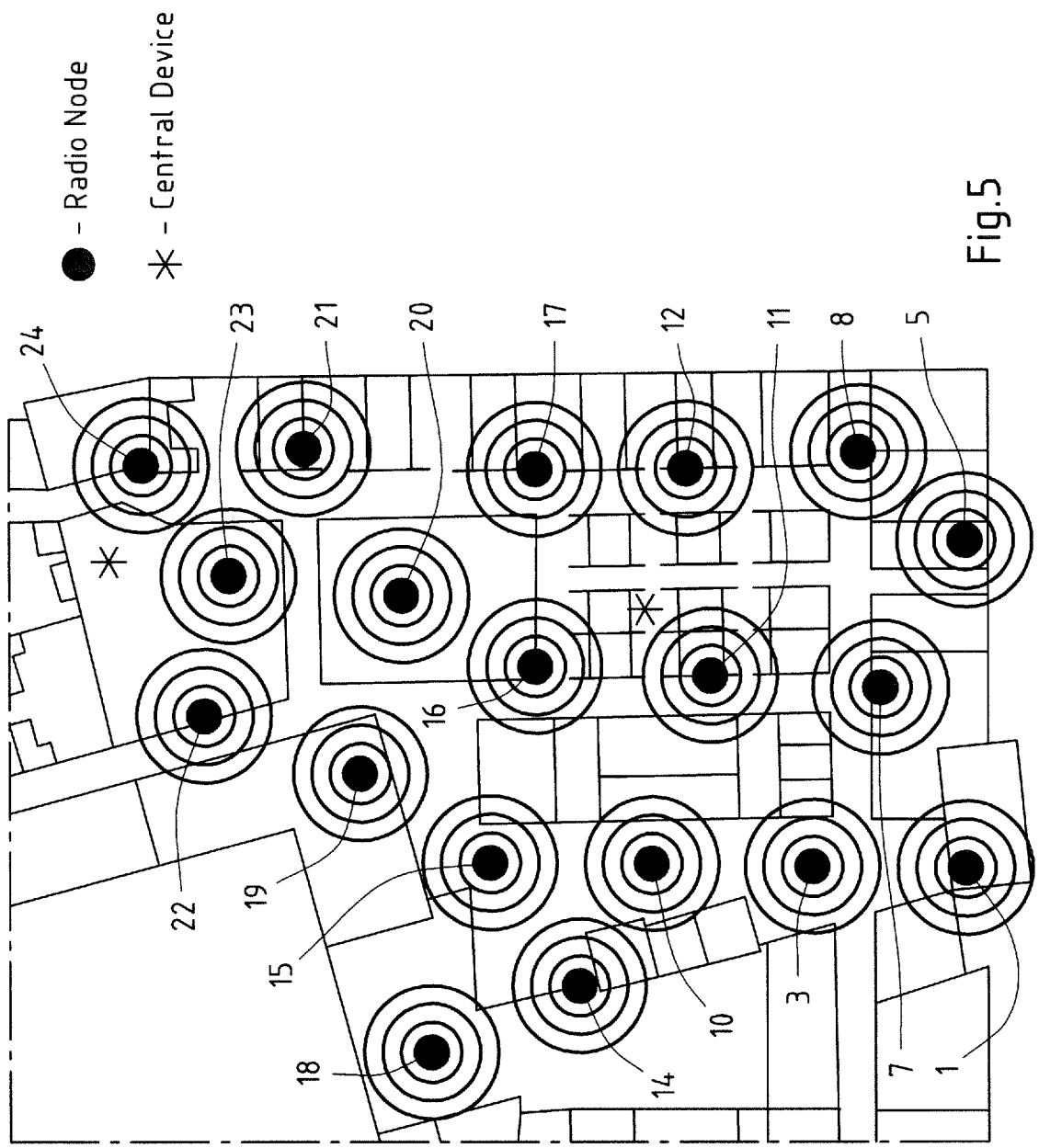
FIG. 5 a map of a venue comprising an example embodiment of a system according to the present invention.

FIG. 5 shows a map of a venue comprising an example embodiment of a system according to the present invention.

At hand, the venue shown in the map comprises 24 radio nodes (e.g. BLE beacons, each marked in FIG. 5 by the dot indication). The location of each radio node in the venue can be seen. Each respective radio node is separated from its adjacent radio nodes about 10 meters. The radio nodes are located in the venue in a grid-like arrangement. The number accompanying each dot in FIG. 5 represents the identifier information (ID) associated with each respective radio node.

Figure 6:
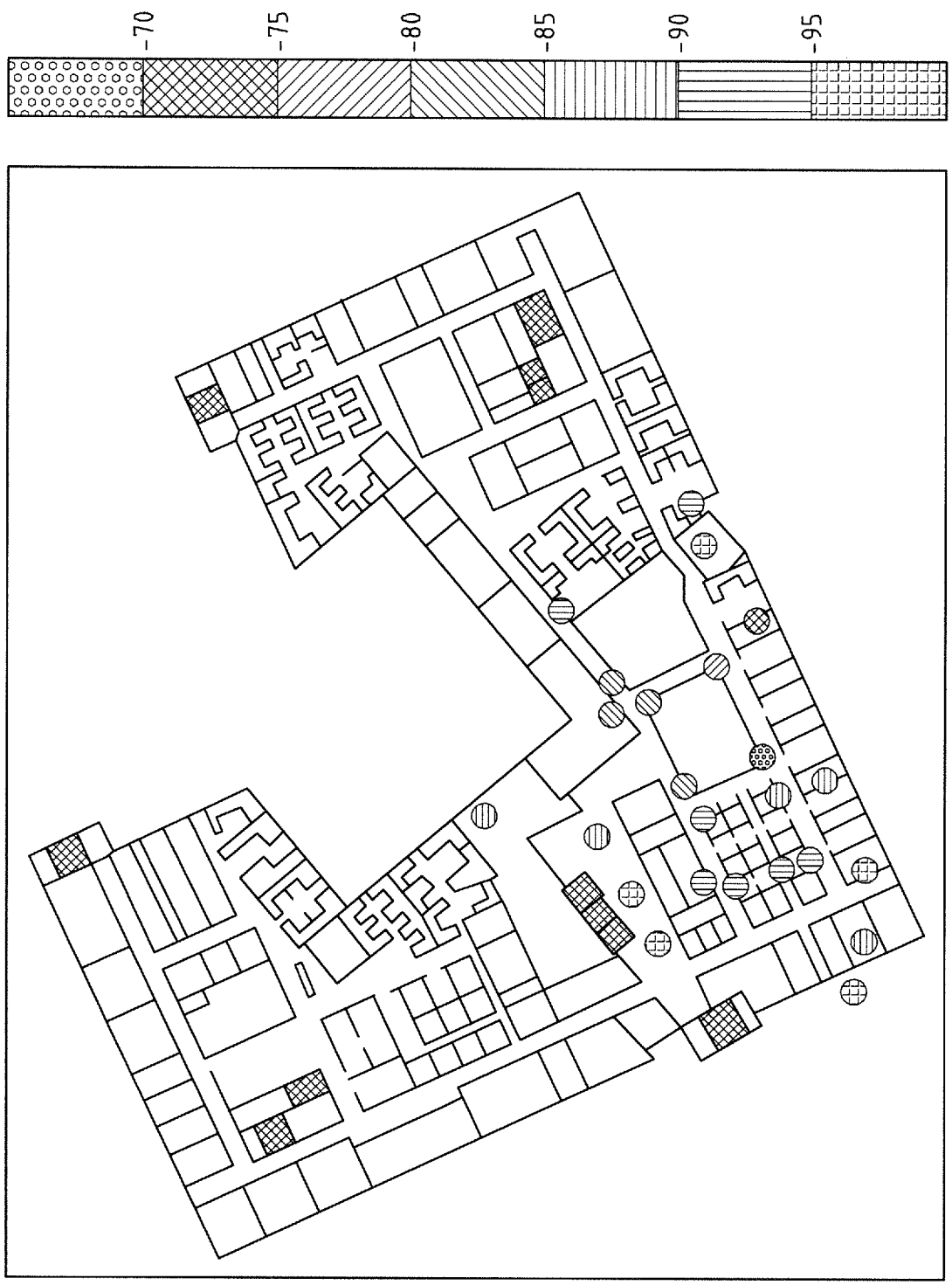
FIG. 6 a map of a venue, wherein collected fingerprints associated with positions in the venue are visualized, e.g. as used in an example embodiment of a method according to the present invention.

FIG. 6 shows a map of a venue, wherein collected fingerprints associated with positions in the venue are visualized, e.g. as used in an example embodiment of a method according to the present invention.

FIG. 6 shows an example of an obtained plurality of fingerprints. In particular, FIG. 6 shows sample fingerprints of the radio node with the identifier information '17', each of which is determined by surrounding radio nodes. After the sample fingerprints are determined, they are broadcasted and obtained by the electronic device (e.g. electronic device 110 of FIG. 1).

The collected fingerprints associated with positions in the venue can be used to generate a radio map of the respective radio node, which collected the fingerprints.

Fingerprints may for instance be used in different ways also to generate different kind of radio maps, e.g. generating compressed radio maps, and/or generating parametric models, or the like, to name but a few non-limiting examples. One example of a generated radio map may for instance comprise interpolating the collected fingerprints associated with positions in the venue into a radio map. Optionally or alternatively, other machine learning algorithms may for instance be used to generate a radio map based (at least partially) on the collected fingerprints associated with positions in the venue.

The hatching of the dots representing sample fingerprints (represented by the dots in FIG. 6) each indicates the observed RSS value at the respective location (see legend on the right side of FIG. 6). Based at least on this information, a radio map is generated, e.g. by an electronic device (e.g. the electronic device 110 of FIG. 1).

The electronic device obtains all pieces advertisement information of surrounding radio nodes, e.g. the plurality of fingerprints. Each respective fingerprint of the plurality of fingerprints is broadcasted by each respective radio node. Each respective fingerprint of the plurality of fingerprints comprises the location of the radio node and a list of all surrounding radio nodes (e.g. BLE beacons), and a RSS value observed at the location of the radio node.

Figure 7:
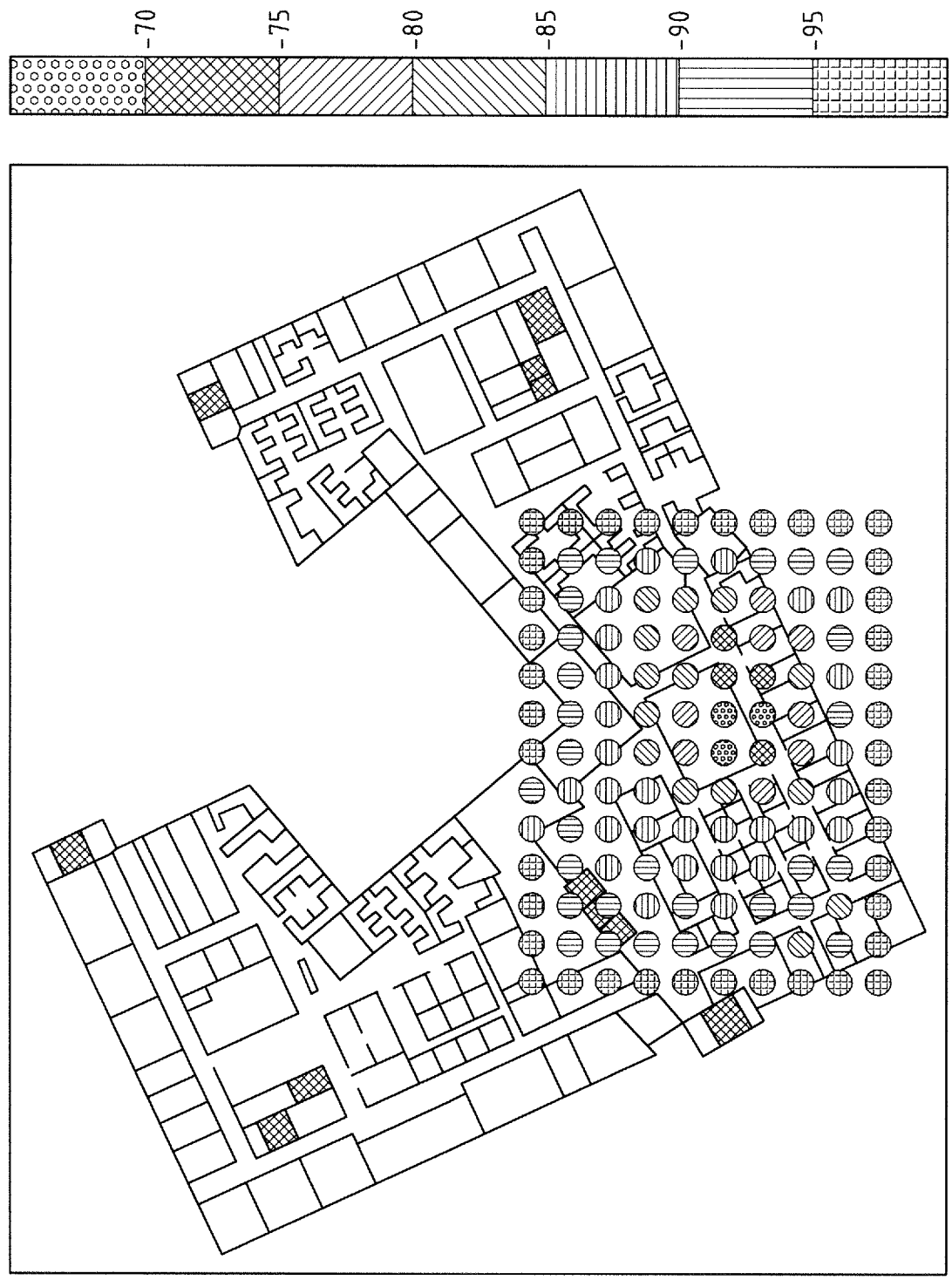
FIG. 7 a radio map of the venue corresponding to FIG. 6, wherein the radio map is additionally interpolated according to an example embodiment of a method according to the present invention.

FIG. 7 shows a radio map of the venue corresponding to FIG. 6, wherein the radio map is additionally interpolated according to an example embodiment of a method according to the present invention The radio map shown in FIG. 7 is interpolated, wherein the parts of the radio map, in particular the grid-points of the radio map to which no RSS value can be associated based on the obtained plurality of fingerprints (see step 201 of FIG. 2), are interpolated, e.g. by calculating in-between-values for said grid points.

The following embodiments shall also be considered to be disclosed:

Radio fingerprinting is widely used for positioning. The fingerprinting requires collection of radio samples from the known locations of the building.

For collecting data for fingerprinting, radio surveying is widely used. The surveying has many drawbacks. Firstly, it takes significant time from a surveyor. He must walk around whole building multiple times to collect radio samples. Additionally, the surveyed data do not adapt with changes in radio environment, which could happen after surveying is completed. The changes in radio environment degrade positioning quality. There are many factors which can change building radio environment such as infrastructure changes, e.g. new structure is built or the old structure is destroyed etc.; presence or absence of people.

Surveying is a poor method for maintenance of radio map. It is very difficult to maintain quality of radio map with surveying approach. Service providers must track changes in the building infrastructure which itself is difficult. Additionally, the service provider must repeat surveying campaign every time there is a change in building infrastructure.

Moreover, creation and distribution of surveying based fingerprinting is expensive, as it requires operating cost of back-end and front-end servers.

A novel system is proposed which creates good quality radio map for fingerprinting. The system is easy to setup. The system overcomes the challenges of surveying and distribution of radio map. It is self-maintaining and adaptive to the changes in radio environment.

The approach uses radio beacons to setup SLAM (Simultaneous Localization and Mapping) for mobile devices. In this approach, radio beacons require to sense its environment and broadcast the sensed radio environment information to help surrounding mobile devices to learn radio environment. The radio beacons are termed also as mirror beacons in this specification.

A mirror beacon has following characteristics:
knows its location;
aware of its surrounding, e.g. it senses surrounding radio devices with its receiver;
saves surrounding radio environment info in its database;
broadcast learned/stored radio environment and its location;
the mirror beacon advertisement served as a sample radio fingerprint for other BLE devices.

A SLAM can be created by setting up multiple mirror beacons in a building. A SLAM required creation of map and use of the map for positioning. Mapping phase of SLAM for a mobile device is explained in more details in the following: A mobile device receives radio broadcasts of all mirror beacons. Each broadcast served as sample fingerprint. Collecting all sample fingerprints a mobile device can create its own radio map.

Localization of SLAM is done by using the radio map created by the device. The mobile device match radio can report against its own created radio map to estimate its position within the map.

The novel approach for setting up positioning system has many benefits compared to traditionally fingerprinting methods:
Adaptiveness: it is very adaptive; each mirror beacon sense the radio environment in real-time and report all possible changes in radio environment to other devices;
Low maintenance: once the system has been set up, a service provider does not have to track infrastructure changes and repeating surveying campaigns to maintain positioning performance; Setting up the system take less time than surveying approach.

One exemplary implementation of a system is explained with BLE (Bluetooth Low Energy) beacons.

Creation of Mirror Beacon:
It is easy to create a mirror beacon. It consists of standard BLE technology. User defined advertisements in BLE protocol can be utilized to broadcast beacon location and learned radio environment by the mirror BLE beacon.

For learning beacon, can store in its memory RSS, ID (e.g. MAC address) and other advertisement data which can help to identify surrounding device uniquely (e.g. iBeacon or eddy stone advertisements).

Setting Up System:
A positioning system can be set up by distributing mirror beacons around the building (e.g. venue) and program each beacon with its location. One exemplary method to distribute beacons is to distribute them in a grid, where each beacon is approximately 10 meter apart from each other. FIG. 5 shows one example of distributing the beacons.

Mapping:
Mapping may for instance produce (e.g. generate) a radio map for a mobile device. The mobile device collects all advertisements of surrounding mirror beacons. Each broadcast is equivalent to single radio fingerprint. The radio fingerprint has location and list of all BLE devices and RSS received at the beacon location. Collection of mirror BLE broadcast(s) (e.g. fingerprint samples) of surrounding mirror beacons enable a mobile device to create its radio map. Radio map is created by interpolating the fingerprints.

Example of collection of advertisements of mirror beacons is shown in FIG. 6. FIG. 6 shows fingerprinting sample of beacon 17 of FIG. 5 collected by a mobile device from surrounding mirror beacons. In FIG. 6, the dots filled with different hatchings represent locations where beacon 17 advertisements was received by surrounding beacons and the hatching that fills each of the dots indicates a RSS-value at the locations. This is all information which is required to create radio map.

Radio map can be created from the fingerprints samples by interpolating the signals. FIG. 7 shows the radio map of beacon 17 created by interpolating the signal.

Localization:
Localization of the device can be done by comparing BLE scan report of mobile device against radio map created in mapping phase and estimate the position of user. The comparison can be done by calculating likelihood of scan in the radio map. One exemplary method to calculate likelihood is Bayesian method which uses normal density function. The calculated likelihood at grid points of radio can be combined with weighted mean to estimate device location. Comparing the results of positioning with mirror beacons with the results of positioning using surveying, the following was achieved: The mean error of mirror beacon is 3 m which was slightly (10 cm) better than the result achieved by surveying for the specific test track.

Advantages:
Very cheap to run positioning system. Does not require back-end and/or front-end server for distribution of radio map which are very expensive;
Memory efficient: a mobile device can create its own radio map on demand. It does not have to store the radio map of the whole building;
Adaptive: the positioning system is very adaptive; each mirror beacons sense the radio environment in real time and reports all possible changes in radio environment to other devices;
Radio samples collected by the device from beacons reflect the true surrounding of the environment which helps positioning algorithm to estimate a device location very accurately;
Low maintenance: once the system has been set up, a service provider does not have to track infrastructure changes and repeating surveying campaigns to maintain positioning performance;
Setting up the system takes less time than the surveying approach.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. An electronic device comprising at least one processor and at least one memory including computer program code, the at least one memory and the computer program code configured to, with the at least one processor, cause the electronic device to at least perform:

obtaining a plurality of fingerprints, wherein each respective fingerprint of the plurality of fingerprints is determined by a respective radio node of a venue based at least on one or more respective radio signals that are (a) sent by one or more respective radio nodes surrounding the respective radio node and (b) observed by the respective node, wherein each respective fingerprint of the plurality of fingerprints comprises a respective piece of position information, wherein the respective piece of position information is indicative of the respective location in the venue of the respective radio node that determined the respective fingerprint, and wherein each respective fingerprint of the plurality of fingerprints further comprises at least one respective piece of identifier information which is associated with the respective one or more radio nodes surrounding the respective radio node, wherein each of the one or more radio nodes surrounding the respective radio node is uniquely identifiable based at least partially on the at least one respective piece of identifier information;

generating a radio map based at least on the obtained plurality of fingerprints;

determining a further radio measurement for a current location of the electronic device, wherein the further radio measurement is determined by measuring at least one property of at least one of the one or more respective signals sent by at least one of the one or more respective radio nodes and observed by the electronic device; and determining the position of the electronic device based at least on the determined further radio measurement and the generated radio map, wherein the radio map is generated by the electronic device at least in part simultaneous to at least one of the determining of the further radio measurement or the determining of the position of the electronic device and the radio map describes an instantaneous radio environment corresponding to the one or more radio nodes.

2. The electronic device according to claim 1, wherein each respective fingerprint of the plurality of fingerprints is indicative of a respective received signal strength value of the one or more respective signals received by the respective radio node.

3. The electronic device according to claim 1, the at least one memory and the computer program code configured to, with the at least one processor, cause the electronic device further to perform:

interpolating the generated radio map prior to the determining of the position of the electronic device.

4. The electronic device according to claim 3, wherein the radio map is divided into a grid-like arrangement comprising a plurality of grid-points, wherein each grid-point of the plurality of grid-points is associated with a fingerprint of the plurality of fingerprints determined at the location of the venue corresponding to the grid-point of the radio map.

5. The electronic device according to claim 1, wherein the generated radio map is outputted.

6. The electronic device according to claim 1, wherein the determining of the position of the electronic device is performed, at least partially, by determining the likelihood that the determined further radio measurement matches one of the fingerprints associated with the radio map.

7. The electronic device according to claim 1, wherein the plurality of fingerprints are obtained based at least partially on one or more broadcasted fingerprints transmitted by the one or more respective radio nodes surrounding the respective radio node.

8. The electronic device according to claim 1, wherein the electronic device is a mobile device.

9. A method, performed by at least one electronic device, comprising:

obtaining a plurality of fingerprints, wherein each respective fingerprint of the plurality of fingerprints is determined by a respective radio node of a venue based at least on one or more respective signals that are (a) sent by one or more respective radio nodes surrounding the respective radio node and (b) observed by the respective radio node, wherein each respective fingerprint of the plurality of fingerprints comprises a respective piece of position information, wherein the respective piece of position information is indicative of the respective location in the venue of the respective radio node that determined the respective fingerprint, and wherein each respective fingerprint of the plurality of fingerprints further comprises at least one respective piece of identifier information which is associated with the respective one or more radio nodes surrounding the respective radio node, wherein each of the one or more radio nodes surrounding the respective radio node is uniquely identifiable based at least partially on the at least one respective piece of identifier information;

generating a radio map based at least on the obtained plurality of fingerprints;

determining a further radio measurement for a current location of the electronic device, wherein the further radio measurement is determined by measuring at least one property of at least one of the one or more respective signals sent by at least one of the one or more respective radio nodes and observed by the electronic device; and determining the position of the electronic device based at least on the determined further radio measurement and the generated radio map, wherein the radio map is generated by the electronic device at least in part simultaneous to at least one of the determining of the further radio measurement or the determining of the position of the electronic device and the radio map describes an instantaneous radio environment corresponding to the one or more radio nodes.

10. The method according to claim 9, wherein each respective fingerprint of the plurality of fingerprints is indicative of a respective received signal strength value of the one or more respective signals received by the respective radio node.

11. The method according to claim 9, the at least one memory and the computer program code configured to, with the at least one processor, cause the electronic device further to perform:

interpolating the generated radio map prior to the determining of the position of the electronic device.

12. The method according to claim 11, wherein the radio map is divided into a grid-like arrangement comprising a plurality of grid-points, wherein each grid-point of the plurality of grid-points is associated with a fingerprint of the plurality of fingerprints determined at the location of the venue corresponding to the grid-point of the radio map.

13. The method according to claim 9, wherein the generated radio map is outputted.

14. The method according to claim 9, wherein the determining of the position of the electronic device is performed, at least partially, by determining the likelihood that the determined further radio measurement matches one of the fingerprints associated with the radio map.

15. The method according to claim 9, wherein the plurality of fingerprints are obtained based at least partially on one or more broadcasted fingerprints transmitted by the one or more respective radio nodes surrounding the respective radio node.

16. The method according to claim 9, wherein the electronic device is a mobile device.

* * * * *